Jan. 5, 1943. H. G. POWNING 2,307,299
BATTERY SEPARATOR AND METHOD OF MAKING
Filed Jan. 9, 1940
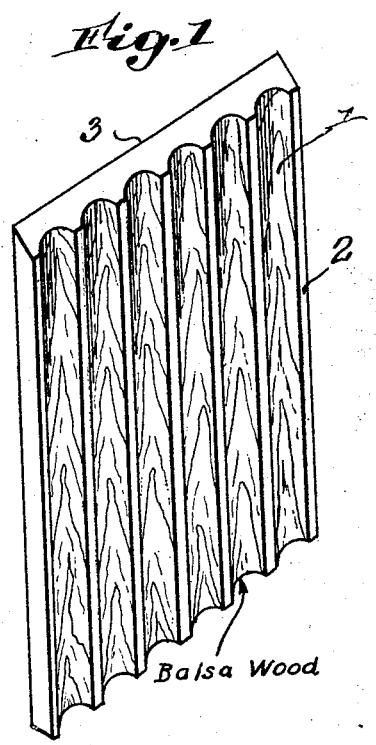
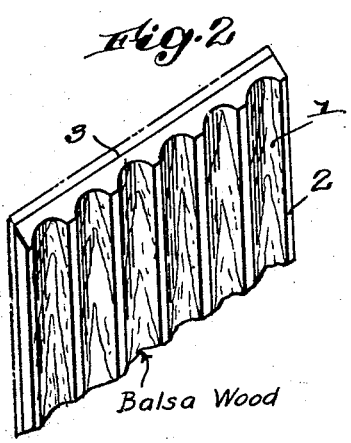
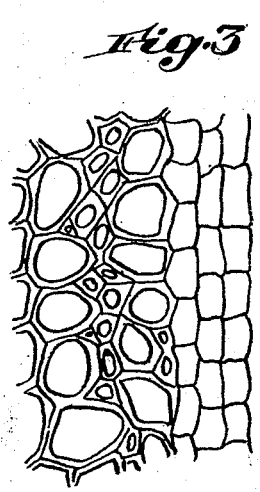
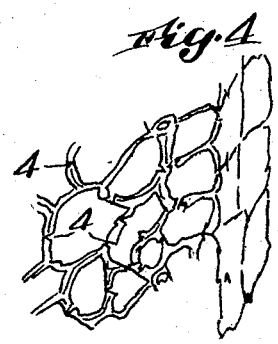
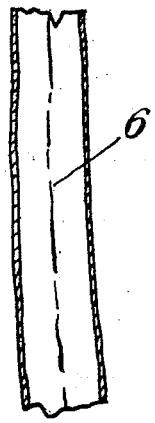
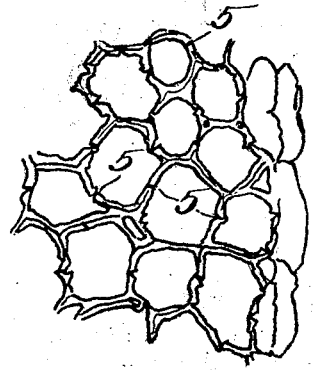
Inventor:
Henry G. Powning,
by Roberts, Cushman & Woodberry
his Attys.

Patented Jan. 5, 1943

2,307,299

UNITED STATES PATENT OFFICE 2,307,299

BATTERY SEPARATOR AND METHOD OF MAKING

Henry G. Powning, Boston, Mass., assignor to Koehler Manufacturing Company, Marlboro, Mass., a corporation of Massachusetts Application January 9, 1940, Serial No. 313,064

10 Claims. (Cl. 136—150)

The present invention relates to separators or diaphragms, as for storage batteries and the like, and more particularly to a method of preparing the same and the resulting product.

In the art of making storage batteries it has already been recognized as disclosed in United States Patent No. 2,120,822, to Grant Wheat, that a diaphragm or separator having a continuous structure and characterized by manifesting permeability to the battery liquids or electrolytes by osmosis in contrast to permeability by direct transmission through interconnected capillaries or pores is desirable. A representative example of this type of diaphragm as there disclosed is found in naturally occurring balsa wood, or woods of similar nature, made of appropriate shape and thickness. In such wood the structure is unique in that the cells of which it is composed are independent of each other and hence do not form continuous pores or capillaries. It is for this reason that permeation of the wood or of the diaphragm, and especially transversely of the grain structure, must necessarily be by virtue of osmosis rather than by capillary flow.

Such diaphragms are especially suitable for the purpose when once completely permeated by the battery acid or electrolyte. But the step of initially saturating such separators with the battery solution takes place slowly and requires a considerable length of time to accomplish. In order to hasten such saturation, it is common practice to treat the separator first with a dilute solution of alkali which seems to penetrate the wood more rapidly than acids, and then to wash out the alkali and neutralize it with an acid solution and to wash out the salts resulting from such neutralization as completely as may be. However, such treatment is slow, and while the soluble salts thus formed may be quite completely removed, the removal of soluble salts formed by reaction of the alkali with organic acids initially present in the wood is much slower and much more incomplete and indefinite of accomplishment.

After such preliminary treatment the separators are then soaked in the acid or electrolyte corresponding to that to be employed in the battery, and when thus completely saturated may be assembled with the other elements of the battery structure and submerged in the battery liquid in the usual way. But if not already saturated before introducing into the battery liquid such impregnation therein will be very slow.

It is therefore an object of the present invention to avoid such preliminary treatments of the separator and yet to accomplish the proper saturation of the diaphragm with the battery solution or electrolyte quickly. It is also an object to retain the advantageous features of a separator through which the transmission of the electrolyte (and subsequently the electric current) may be characterized as that of an imrent) permeable membrane, exhibiting the property of osmosis. It is also an object to accomplish the saturation of the diaphragm with the electrolyte without the presence of unnecessary or deleterious reagents, and to secure such penetration uniformly, completely and promptly throughout the entire structure. It is also an object to be able to assemble the dry separator with the other elements of the battery or cell and attain prompt and complete saturation of it by the electrolyte when this is added. Another object is to provide a treatment of balsa wood, and woods of like nature, whereby their absorption of liquids is facilitated, and made more rapid and complete. Other objects of the invention will appear from the following disclosure.

It is now found in accordance with the invention that if a sheet of balsa wood, preferably cut longitudinally of its grain, and of suitable thickness, is subjected to mechanical compression directed at right angles to its grain structure and uniformly applied, and sufficient in degree so as permanently to compress the structure (that is, so that it will not spontaneously and completely resume its former dimensions, while dry, upon release of the pressure), then the resulting compressed sheet of wood is characterized by exhibiting upon immersion in water or aqueous solutions of low viscosity, such as electrolytes, a prompt and uniform absorption of and penetration by such liquid throughout its structure. Moreover, such absorption and penetration progress to a complete saturation of the wood, at least in relatively thin sections such as battery plate separators, without other modification or treatment.

A typical example of the practical application of the invention will be described with reference to battery separators as shown in the accompanying drawing, in which:

Fig. 1 is a perspective view of a grooved separator of a well known type as fashioned from balsa wood;

Fig. 2 is a similar view of the same separator after compression to ¾ or by ¼ of its original thickness;

Fig. 3 is a microscopic cross section (X450) of balsa wood before compression;

Fig. 4 is a microscopic cross section (X450) after compression;

Fig. 5 is a microscopic cross section (X450) after compression and swelling by saturation; and Fig. 6 is a microscopic view of a longitudinal section of a single fiber of balsa wood.

In carrying out the invention, for this purpose, the battery separators may be made of various sizes and shapes, including plain flat sheets of appropriate thickness and other dimensions. In a typical example, the balsa wood may be first cut longitudinally of the grain into thin boards or sheets of the desired thickness, for example one centimeter thick, and then provided with longitudinal flutings 1 also running parallel to the grain as shown in Fig. 1, forming parallel ridges 2 therebetween. It is then cut to the desired size to fit into the batteries to be made. The separator as thus fashioned is then compressed between a flat plate bearing against the flat surface 3 and a suitably fluted plate adapted to fit and receive, respectively, the flutings 1 and ridges 2. It is then compressed between these two plates to such a degree that when the plates are separated the separator will substantially retain the dimensions which it has acquired under compression. The fluted pressing plate may not fit the contour of the flutings exactly but may be so formed as to contact the ridges 2 first and thus result in more uniform compression than would a plate which exactly fitted the fluted separator as first formed. In a further modification, moreover, the fluted separator may be compressed between two flat plates (without any corrugations to correspond to those provided in the separator) and the resulting compressed separator is entirely satisfactory even though the ridges are thus compressed to a greater degree than the body portion.

It is found that a compression which reduces the volume of the wood by 10% or less does not permanently alter the volume of the wood but that it regains its original dimensions when the pressure is released. However, if a compression which reduces the volume by more than 10%, as for example by 25% of its original volume, is applied, such compression apparently exceeds the elastic limit of the cellular structure so that upon release of pressure it does not resume its former volume, when dry, but may do so when wetted. From this degree of compression up to that at which the volume of the wood is reduced by more than 75% and up to 90% of its original volume, compression continues to produce a diaphragm or separator which is adaptable for use where quick uniform penetration by electrolytes is desirable without the loss of its characteristics of osmotic permeability. If compression is carried to too great a degrees, however (for example to reduce the volume by more than 90%), the cell structure may be so disrupted that this characteristic is lost and its value as a battery separator or the like is diminished or destroyed.

By the present invention it is found that a separator of balsa wood as thus treated, without other treatment or any preliminary treatment with the battery solution, and without wetting, may be assembled directly with the other units of the battery construction, have the battery solution applied directly thereto, and in the matter of a few hours at the most, be uniformly and completely saturated by the solution and the assembled battery ready for use. Accordingly, the construction, assembly and utility of the battery produced is greatly improved over those obtained by the procedures of the prior art.

In such compression of the wooden separator there is no observed tendency for the wood to expand longitudinally of the grain and but a slight tendency to expand across the grain, amounting to approximately 5%, for example, when the separator has been compressed to 50% of its original volume.

As is well known in the art, balsa wood is obtained in various grades ranging from light to heavy, which are designated accordingly. The light grades may have a specific gravity as low as 4 lbs. to the cubic foot or a specific gravity of .065, while those of the heaviest grades weight about 12 lbs. to the cubic foot or 0.20 specific gravity.

In actual practice with separators made of such light and heavy grades of balsa wood, and with varying degrees of compression, in dry condition, the resulting separators were found to have an absorptivity with respect to sulphuric acid of 1.280 specific gravity in twenty-four hours as follows (the separators in this case being in the form of flat blanks)—

Table I

| Per cent compression | Grams battery acid solution absorbed per cc. of separator | |
|---|---|---|
| | Light balsa | Heavy balsa |
| 0 | 0.076 | 0.113 |
| 25 | 0.386 | 0.454 |
| 50 | 0.657 | 0.736 |
| 59.3 | | 1 0.844 |
| 75 | 1 0.968 | |

1 After 17 hours of soaking.

Similar results upon soaking for seven days in the acid solution were obtained as follows:

Table II

| Per cent compression | Grams battery acid solution absorbed per cc. of separator | |
|---|---|---|
| | Light balsa | Heavy balsa |
| 0 | 0.312 | 0.345 |
| 25 | 0.534 | 0.684 |
| 50 | 0.753 | 0.895 |
| 59.3 | | 0.945 |
| 75 | 1.085 | |

On the other hand, after soaking in the acid for a very short period, of one-half hour, the following degrees of absorption by the separators were obtained:

Table III

| Per cent compression | Grams battery acid solution absorbed per cc. of separator | |
|---|---|---|
| | Light balsa | Heavy balsa |
| 0 | 0.061 | 0.084 |
| 25 | 0.112 | 0.165 |
| 50 | 0.236 | 0.522 |
| 59.3 | | 0.748 |
| 75 | 0.916 | |

In compressing the heavy balsa wood by 60%, or to 40% of its original volume, a pressure of approximately 1000 lbs. per square inch was required, whereas with the light balsa wood a compression of approximately 600 lbs. per square inch effected a 75% compression or reduction of the compressed wood to 25% of its original volume.

Battery separators made of balsa wood of intermediate grade (having an apparent specific gravity of about 0.14) and provided with flutings as above described and shown in the drawing, were similarly compressed, in dry condition, and their resulting absorptivity determined as follows:

Table IV

| Per cent compression | Grams battery acid solution absorbed per cc. of separator | | |
|---|---|---|---|
| | After ½ hr. | After 24 hrs. | After 7 days |
| 0 | 0.132 | 0.162 | 0.441 |
| 25 | 0.216 | 0.446 | 0.666 |
| 50 | 0.382 | 0.682 | 0.822 |

In this case, the overall reduction in volume was determined by immersion of the fluted separator in mercury, which would not be absorbed by the separator and hence serve as a measure of its total volume whether in its original condition or after compression.

Accordingly separator plates made of balsa wood, whether they consist of plain flat sheets of the wood or whether they have been given various conformations, as above described, may be compressed, in the dry condition, and thereby rendered rapidly absorptive of liquids such as water or aqueous solutions or other liquids of correspondingly low viscosity, such as the electrolytes of battery liquids. Consequently such battery plates may, in the dry condition, be assembled with the other structural elements of the battery construction (without any preliminary wetting treatment whatsoever) and the battery liquid then added, whereupon the liquid rapidly permeates the wooden separator or separators and uniformly and completely saturates them, so that in the matter of a few hours at most the battery is finished and ready for use.

While no theory need be advanced to explain the results obtained above, the microscopic cross-sectional views given herewith are effective to demonstrate that while the cell structure has been altered so that the cells do not spontaneously regain their original volume and shape, while dry, their continuity is nevertheless preserved. This may be further explained by reference to Fig. 6 in which it is seen that the individual fiber, although apparently split lengthwise, as at 6, has not been opened up. It is therefore thought and suggested that the change effected by the compression is one of weakening and effectively thinning the wall of each cell by compressing it beyond its yield point, but that it has not been effective to rupture or displace the walls of the cell structure such as would destroy its osmotic relationship to a low viscosity liquid (such as the battery solution) in its penetration to and through each cell in the course of its progress through the wooden separator. This is corroborated by the continued satisfactory operation of separators as thus compressed during operation of the battery which is equal or superior to that of similar separators which have not been compressed and which have been saturated with the battery solution by the slower procedures described above.

Accordingly, when a dry separator which has been thus compressed in accordance with the present invention is assembled in a battery, for example, and is then wetted with the electrolyte or battery liquid, the liquid penetrates rapidly into each cell and from cell to cell, and probably more especially through the thinned or fractured portions of the cell, as indicated at 4, 4 in Fig. 4. Hence the liquid rapidly and uniformly and completely penetrates and saturates the wood structure throughout. Since such cell structures are not destroyed nor displaced, and the adjoining edges of the fractures 4, 4 are split only as indicated in Fig. 6 and neither spaced apart nor displaced one from the other, they still retain their original configuration and, upon being filled with liquid, are rounded out to their original shape and size. This is indicated by the fact that the separator resumes practically its original volume and shape, upon complete saturation with aqueous liquids. The fractures in the cell walls are thereby closed, by the filling and swelling action of the aqueous liquid as indicated at 5, 5 in Fig. 5, the edges rejoin the walls, resume their original shape and continuity so as to reestablish and maintain their original characteristic of osmotic permeability to liquids. The arch-shaped or closed circular form of the cells tends to retain the fractured edges in place and to reinforce the thus reacquired original form of the cell structure. The cell and cell walls also reacquire and exhibit the original characteristic property of osmotic transmission of liquids such as electrolytes and of the electric current therethrough.

Therefore, as mounted in an electric cell or battery with the other elements of its construction and the electrolyte, the separator is rapidly saturated by the electrolyte, uniformly and completely, absorbing the liquid sufficiently to resume its original dimensions and shape and is ready for immediate use, in which it exhibits the desirable characteristic of osmotic permeability to the battery liquid or electrolyte, and to the functioning of the electric current therethrough.

It is to be understood that the process of the invention is generally applicable to balsa wood, and allied woods of similar nature which are characterized by a like cellular structure, and by having the property of being semi-permeable to liquids or true solutions. It is also applicable, when the wood in question is contemplated for use with other aqueous solutions than the acidic battery liquids described above, as for example with water alone, and with other liquids of low viscosity generally. It is also effective with such woods to promote their absorptivity and retain their permeability and osmotic characteristics, with respect to such other liquids, and at the same time to increase the rate of absorption.

I claim:

1. Method of making separators for storage batteries and the like, comprising the step of subjecting a sheet of balsa wood, of suitable size and shape, to compression transversely of its grain and of sufficient degree to reduce the volume of the wood by 10% to 90% of its original volume, and wetting the same directly in the electrolyte of the battery whereby the separator is restored substantially to its original volume.

2. Method of making separators for storage batteries and the like, comprising the step of subjecting a sheet of balsa wood, of suitable size and shape, to compression transversely of its grain and of sufficient degree to reduce the volume of the wood by 25% to 75% of its original volume and wetting the same directly in the electrolyte of the battery, whereby the separator is restored substantially to its original volume.

3. Method of making separators for storage batteries and the like, comprising subjecting a sheet of balsa wood, of suitable size and shape, to compression transversely of its grain and of sufficient degree that it does not spontaneously nor completely regain its original volume upon release of said compression, assembling the same, in dry condition, with the other elements of the battery construction and thereafter wetting with the battery liquid.

4. Method of treating balsa wood comprising the steps of subjecting it to compression transversely of the grain to such a degree that it does not spontaneously nor completely regain its original volume upon release of said compression and then wetting with an aqueous electrolyte, whereby the wood is completely and quickly saturated therewith and restored substantially to its original volume.

5. Method of treating balsa wood comprising the steps of subjecting it to compression transversely of the grain and to such a degree as to reduce its dimension in this direction by 10% to 90% and wetting with water, whereby the wood is restored substantially to its original volume.

6. Method of treating balsa wood comprising the steps of subjecting it to compression transversely of the grain and to such a degree as to reduce its dimention in this direction by 25% to 75% and wetting with water, whereby the wood is restored substantially to its original volume.

7. Method of treating balsa wood comprising the step of subjecting it to compression transversely of the grain and to such a degree as to reduce its dimension in this direction by 10% to 90% and thereafter immersing the same in an electrolyte whereby it promptly absorbs the liquid uniformly and to complete saturation and is further characterized by manifesting osmotic permeability to liquids and with respect to the passage of an electric current.

8. A storage battery comprising a separator of balsa wood, compressed to a sufficient degree that its cell walls are fractured and it does not spontaneously nor completely regain its original volume upon release of said compression when dry, saturated with the electrolyte of the battery and swollen to substantially its original size and shape.

9. A storage battery comprising a separator of balsa wood, compressed to a sufficient degree that it does not spontaneously nor completely regain its original volume upon release of said compression when dry, assembled with the remaining elements of said battery in dry condition.

10. A storage battery separator of balsa wood, wherein the cell walls are fractured but of substantially their original shape and volume, saturated with an aqueous electrolyte.

HENRY G. POWNING.